Patented Aug. 16, 1949

2,479,310

UNITED STATES PATENT OFFICE 2,479,310

DRY EGG COMPOSITION

Edward K. Chapin, Chicago, Ill.

No Drawing. Application March 21, 1947,
Serial No. 736,417

2 Claims. (Cl. 99—210)

This invention relates to the production and preservation of egg solids in dry form.

It also relates to the production of a novel powdered composition containing egg and milk solids and edible fat, the product being of enhanced utility and keeping quality suitable for use in baking, preparation of baking mixes and other food products, and wherein the egg component is maintained and preserved for protracted periods of storage in a manner whereby it substantially retains the characteristic properties of fresh eggs upon reconstruction with moisture in the preparation of food products.

I am aware that it is known to dehydrate and powder eggs and to use them alone or as an admixed component in prepared mixes and other food preparations. However, it is also known and recognized by those skilled in the art that previous standard, commercially dried eggs are not very storage stable but rather are rapidly subject to development of unpleasant flavors and odors and impairment of natural egg functions, and other deterioration on storage. Other investigators in this field have recognized the deficiencies of standard, commercially dried eggs and their variability from a functional standpoint, particularly with respect to their effect on baking qualities in cakes or other baked, fried or cooked products. The consensus of opinion is that these deficiencies and differences observed in dry egg powders are connected with the solubility of the nitrogen-containing constituents of the egg in aqueous potassium chloride solution or water. For example, Ary and Jorden in volume 10 of "Food Research," 1945, in an article entitled "Cakes and custards from spray dried whole egg powder" state that "Egg powders having greater solubility produced plain butter cakes of better volume and better eating quality than egg powders having a lower solubility." These authors state that there are two sources of the insolubility causing poor quality and they are "processing" and "storage."

In general, there are at least three problems connected with the production and use of dried whole eggs, dry yolks and dry whites for prepared foods and baking mixes and baker products, these being: injury to the egg solids during drying; impairment of functions of eggs during storage, when either in the form of dry eggs or incorporated as a separately prepared component in prepared food mixes; and incompleteness of reconstitution upon the addition of water which results in a significant reduction of the emulsifying, volume-producing and edibility-improving properties of the egg solids present.

It is an object of the present invention to prepare and preserve eggs or their components to prevent the alteration of egg properties due to oxidation, denaturation or decomposition of the egg constituents, whereby the fresh egg characteristics necessary to secure high quality of prepared food mixes in dry form are maintained over long storage periods.

The present invention provides protection of the egg solids from protein content insolubilization or other deleterious changes due to heat or surface denaturation during the process drying period so that the solubility of the water-soluble protein is maintained through the drying step and upon subsequent storage and use of the dried product; provides preservation or prolongation of the baking functions of egg solids for many months after drying; and in the finished product provides a substantially complete reconstituting material so that the emulsifying, volume-producing and edibility-improving properties of the egg solids remain active and are largely realized in the finished food products, such as doughnuts, cakes, muffins, waffles, rolls, biscuits, etc.

The objects of the present invention are, in general, accomplished by blending together edible fat, liquid egg material and liquid milk material at temperatures to prevent injury to the egg solids, followed by emulsification and spray drying. This produces a comminuted or powdered product of a creamy, yellow, soft character which may be used directly in the preparation of baked products or for preparation of food mixes. The powder may supply all or a part of the fat, egg and milk requirements of the formulas in which it is used.

In the preparation of my composite product, I may employ either fresh or frozen whole liquid eggs, whole yolk or white, or mixtures thereof. Likewise, I may employ either whole or skimmed liquid milk is normal or concentrated form, powdered milk in reconstituted form and the like aqueous milk solids medium. The edible fat component may be either an oil or a solid and of either vegetable or animal origin, and is preferably at least partially hydrogenated for enhancement of keeping quality or storage stability.

In carrying out my process, the liquid egg, milk and fat components are rapidly added together and thoroughly mixed under warm conditions, preferably at a temperature not in excess of 135° F. after the eggs are added to facilitate intimate mixing but to prevent injury to the egg solids and, particularly, that injury due to coagulation of the proteins thereof. If the fat employed is a solid, it is pre-heated to melt it prior to admixture. This mixing step provides what may be termed "pre-emulsification," and although emulsification agents may be added, I do not find them essential either in this pre-emulsification step or in the subsequent emulsification step due to the fact that the egg component naturally contains materials, such as lecithin, which are emulsifying agents.

This pre-emulsification mixture is then subjected to emulsification to form a more stable oil-in-water emulsion and to finely sub-divide the materials by employing mechanical means, such as a homogenizer or colloid mill. I preferably accomplish emulsification by passing the preformed mixture, either with or without continued agitation, to a homogenizing machine at a pressure of from about 500 to about 2,500 pounds per square inch or more to provide a finely divided stable and highly uniform emulsion.

This final emulsion is then subjected to spray drying by means of Gray and Jensen, Rogers or other conventional spray drier. This causes the emulsified material to become atomized and dried by rapid evaporation of the moisture to provide a soft, yellow, creamy powdered product.

The added fat serves to preserve the egg component by insulating the delicate egg solids from induction of air during the steps of emulsification and subsequent dehydration and also tends to act as a buffer to prevent coagulation of the egg solids when the flash heat of the drying step is evaporating the moisture from the emulsion. The milk solids, in addition to acting as an absorptive and holding medium, serves to prevent denaturization of the water-soluble egg proteins and to retain the solubility of these proteins not only during the product drying step, but also upon reconstitution thereof by addition of moisture in the utilization of my novel composite in the production of food products.

The following examples are illustrative of compositions or formulations employed in preparing my novel egg-milk-fat powder:

EXAMPLE 1

To make 500 pounds of egg-milk-fat powder composed of 48 per cent hydrogenated vegetable soy oil, 26 per cent egg yolk solids, 2 per cent albumen solids, and 24 per cent skim milk solids, the following ingredients were placed in a warming vat and thoroughly mixed:

|  | Pounds |
|---|---|
| Hydrogenated soy oil | 240 |
| Egg yolk | 289 |
| Egg albumin | 80 |
| Normal liquid skim milk | 1,410 |

This mixture contains about 75% by weight of water.

EXAMPLE 2

Another powder was made composed of 25 per cent lard, 16 per cent whole egg solids, and 59 per cent skim milk solids, and to make 500 pounds of powder the following ingredients were used:

|  | Pounds |
|---|---|
| Lard | 125 |
| Whole eggs | 295 |
| Skim milk containing 16 per cent solids | 1,850 |

This mixture contains about 82% by weight of water.

EXAMPLE 3

Another powder was made composed of 48 per cent corn oil, 15 per cent egg yolk solids, 10 per cent sugar, and 27 per cent skim milk solids, and to make 500 pounds of powder the following ingredients were used:

|  | Pounds |
|---|---|
| Corn oil | 240 |
| Egg yolk | 185 |
| Sugar | 50 |
| Dry skim milk | 140 |
| Water | 750 |

This mixture contains about 62% by weight of water.

It will be understood that I am not confined to the foregoing specific materials or percentages, and that I may use any combination as herein previously generally described. However, as will be seen from the above examples, each of the mixtures contains a major proportion by weight of water. It is preferred to have a sufficient amount of fat to provide from at least about 25 per cent to about 75 per cent thereof by weight of the solids in the powdered product. It is also preferred to have an amount of aqueous milk solids medium to provide from at least about 15 per cent to about 60 per cent of milk solids in the final product. The egg component may provide from 1 per cent to 60 per cent of the total solids.

These aqueous solutions were then passed through an homogenizer which caused an intimate emulsion to result. They were then passed to a spray-drying machine and the moisture evaporated to produce a powder.

The following examples and tables are illustrative of the use of my novel egg-milk-fat powder and the comparative benefits thereof:

EXAMPLE 4

A prepared cake mix was made up containing flour, sugar, leavening, salt, and 18 per cent of the egg-milk-fat powder of Example 1. Water was added to the dry mix and the mass stirred to form a cake batter which was then placed in a cake-tin and baked in a normal way. The cake had a fine grain, "caky" texture, good volume, and dissolved agreeably in the mouth when eaten. A comparison between the quality scores of cakes made from a standard dried egg, the egg-milk-fat powder, and fresh eggs, on an equivalent solids basis, is given in Table I as follows:

TABLE I

|  | Perfect Score | Cake Made With Standard Dried Egg (14 Days After Drying) | Cake Made With Egg-Milk-Fat Powder (14 Days After Drying) | Cake Made With Fresh Eggs |
|---|---|---|---|---|
| Volume | 30 | 27 (290 Ml. per 100 Grams of Cake) | 29 (332 Ml. per 100 Grams of Cake) | 29 (335 Ml. per 100 Grams of Cake) |
| Grain | 20 | 19 (Slightly Coarse) | 20 | 20 |
| Softness | 20 | 19 | 20 | 20 |
| Tenderness | 20 | 19 | 20 | 20 |
| Crumb Color | 5 | 4 (Slightly Dull) | 5 (Bright) | 5 |
| Symmetry | 5 | 5 | 5 | 5 |
|  | 100 | 93 | 99 | 99 |

EXAMPLE 5

Part of the dry prepared mixes containing the egg-milk-fat powder and standard dried egg were retained at a temperature between 75 and 100° F. for six months, after which a second baking test was made. While the baking quality of the dry mix containing the egg-milk-fat powder decreased only slightly, the dry mix containing the standard dried egg powder deteriorated quite significantly. This difference is given in Table II as follows:

TABLE II

*Cakes made from dry mix 6 months old*

|  | Perfect Score | Standard Dry Egg | Egg-Milk-Fat Powder |
|---|---|---|---|
| Volume | 30 | 25 (254 Ml. per 100 Grams of Cake) | 28 (310 Ml. per 100 Grams of Cake) |
| Grain | 20 | 17 (Coarse) | 19 |
| Softness | 20 | 16 | 18 |
| Tenderness | 20 | 17 | 19 |
| Crumb Color | 5 | 4 (Dull) | 5 (Bright) |
| Symmetry | 5 | 5 | 5 |
|  | 100 | 84 | 94 |

Even after six months, the grain, texture and eating quality changed only slightly, while the cake made from the mix containing the standard, commercially dried egg, had deteriorated to the extent that it was considered to be of poor eating quality. The main reason for this preservation of baking qualities in the prepared mix containing the egg-milk-fat powder over the extended storage period was the condition of the egg solids in the mix, due to the preservation of those egg solids by the process described herein. Further, the complete reconstitution of the egg solids, when used in the form of the egg-milk-fat powder, was at least partly responsible for the good quality cakes made from both the freshly-made dry mix and the stored dry mix.

I claim as my invention:

1. The method of preparing powdered egg materials and for preserving them in a storage stable condition and for substantially retaining the normal fresh character and function of the egg upon reconstitution with water in the preparation of food products which comprises preparing a mixture of liquid egg material, aqueous milk solids medium and edible fat in liquid condition by intimately mixing them while warming at a temperature not in excess of about 135° F. and in proportions to form a final powdered product containing from about 25% to about 75% by weight of fat, from about 15% to about 60% by weight of milk solids and from about 1% to about 60% by weight of egg component, said mixture containing a major proportion by weight of water whereby the mixture is atomizable, forming said mixture into an oil-in-water emulsion by mechanical emulsification thereof under pressure, and spray drying said emulsion to rapidly evaporate the moisture content thereof and to reduce it to a finely divided composite particle condition.

2. The process of claim 1 further characterized in that said egg material comprises egg yolk.

EDWARD K. CHAPIN.

REFERENCES CITED

The following references are of record in the file of this patent:

UNITED STATES PATENTS

| Number | Name | Date |
|---|---|---|
| 762,277 | Campbell | June 14, 1904 |
| 1,895,694 | Tranin et al. | Jan. 31, 1933 |
| 1,897,775 | Tranin | Feb. 14, 1933 |
| 2,237,087 | Littlefield et al. | Apr. 1, 1941 |

FOREIGN PATENTS

| Number | Country | Date |
|---|---|---|
| 19,512 | Great Britain | Aug. 25, 1910 |